US011729636B1

(12) United States Patent
Ahmed et al.

(10) Patent No.: US 11,729,636 B1
(45) Date of Patent: Aug. 15, 2023

(54) NETWORK CLUSTERING DETERMINATION

(71) Applicant: T-Mobile USA, Inc., Bellevue, WA (US)

(72) Inventors: Syed Umair Ahmed, Dublin, CA (US); Aditi Saluja, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 132 days.

(21) Appl. No.: 17/207,333

(22) Filed: Mar. 19, 2021

(51) Int. Cl.
*H04W 24/02* (2009.01)
*H04W 16/18* (2009.01)
*H04W 4/029* (2018.01)

(52) U.S. Cl.
CPC .......... *H04W 24/02* (2013.01); *H04W 4/029* (2018.02); *H04W 16/18* (2013.01)

(58) Field of Classification Search
CPC ...... H04W 24/02; H04W 4/029; H04W 16/18
USPC .......................................................... 370/254
See application file for complete search history.

(56) References Cited

U.S. PATENT DOCUMENTS 6,236,365 B1 * 5/2001 LeBlanc ............... G01S 5/0009 342/450
2006/0268733 A1 * 11/2006 Rhee ................... H04L 41/0853 370/252
2008/0005298 A1 * 1/2008 Busalacchi ............. H04L 41/08 709/223
2012/0093078 A1 * 4/2012 Perlman ................. H04B 7/024 370/328
2016/0359697 A1 * 12/2016 Scheib ................ H04L 63/1425
2018/0146340 A1 * 5/2018 Bessho ................. H04W 4/029
2020/0022006 A1 * 1/2020 Froehlich ............ G06F 11/3447
2020/0314826 A1 * 10/2020 Sharma ................ H04B 7/0695
2022/0051139 A1 * 2/2022 Tullberg ................ G06N 20/00

OTHER PUBLICATIONS

Altrad, Load Balancing Based on Clustering Methods for LTE Networks, Cyber Journals: Multidisciplinary Journals in Science and Technology, Journal of Selected Areas in Telecommunications (JSAT), February Edition, 2013, vol. 3, Issue 2, 6 pages.
Shahraki, et al. “Clustering objectives in wireless sensor networks: A survey and research direction analysis” https://doi.org/10.1016/j.comnet.2020.107376; Accepted Jun. 19, 2020, Department of Informatics, University of Oslo, Oslo, Norway, 18 pages.

* cited by examiner

*Primary Examiner* — Hassan Kizou
*Assistant Examiner* — Oladiran Gideon Olaleye
(74) *Attorney, Agent, or Firm* — Lee & Hayes, P.C.

(57) ABSTRACT

Techniques for clustering network elements of a telecommunication network are described herein. For instance, a machine learned model can cluster cells based on a combination of network data, user equipment data, location data, and map data. Clusters output from the machine learned model can be compared to each other to identify an underperforming cell, to generate recommendations that improve performance of a cell, and/or to determine performance benchmarks for cells or networks across different geographical regions.

20 Claims, 7 Drawing Sheets

100
5G System (5GS) 102
5G Core Network 104
Computing Device 106
Clustering Component 128
Analysis Component 130
First Geographic Area 108
First Network Element 112
Unmanned Aerial Vehicle (UAV) 118
Vehicle 114
User Equipment (UE) 116
Second Geographic Area 110
Second Network Element 120
Unmanned Aerial Vehicle (UAV) 126
Vehicle 122
User Equipment (UE) 124

NETWORK CLUSTERING DETERMINATION

BACKGROUND

Modern terrestrial telecommunication systems include heterogeneous mixtures of second, third, fourth and fifth generation (2G, 3G, 4G and 5G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems also include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
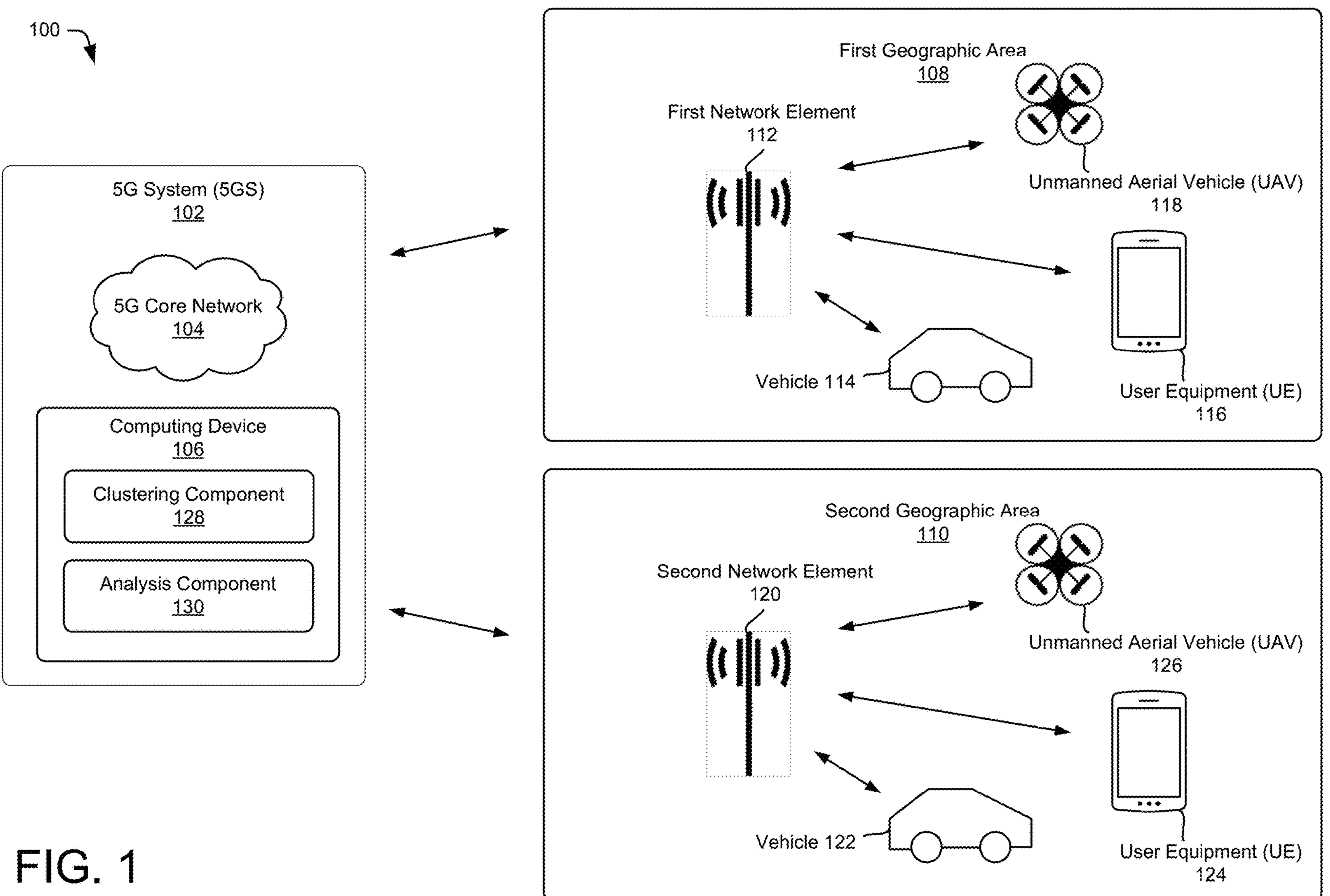
FIG. 1 depicts an example network environment in which example devices can connect to a telecommunication network to implement the clustering techniques described herein.

This application relates to techniques for clustering network elements of a telecommunications network. For instance, a machine learned model can cluster cells based on a combination of network data, user equipment data, location data, and map data. Clusters output from the machine learned model can be compared to each other to identify an underperforming cell, to generate recommendations that improve performance of a cell, and/or to determine performance benchmarks for cells or networks across different geographical regions.

Generally, the machine learned model (also referred to as “the model”) receives data representing user and network attributes in different geographic regions, and outputs clusters of cells that can be further processed in various ways to improve throughput or overall quality of networks in the different geographical regions. The machine learned model can cluster cells based on network configuration data (e.g., bandwidth, security, antennae height, or antennae type, etc.), network user data (e.g., type of user session: FTP, call, etc.), location data (e.g., position of each user relative to a network antennae, location of the network relative to a coordinate system, etc.), and/or geographical data (e.g., elevation of a user equipment (UE) relative to network antennae, map data showing one or more of: a road, a building, a highway, urban area, residential area, etc.). For instance, the model can identify a percentage distribution of samples, or cells, in one or more clusters. As explained further below, a same or different model can compare clusters one to another to identify improvements for a network regardless of where the network is geographically located.

In some examples, an output from the machine learned model can be used to identify network parameters that improve throughput to multiple UEs in communication with the network. In some examples, the network parameters determined by the machine learned model to provide peak throughput can include one or more of: a bandwidth, a Time Division Duplex (TDD) ratio configuration, a frequency, a transmission power, or a beamforming Precoding Matrix Indicator (PMI), a location, a signal strength, or a signal-to-noise ratio, just to name a few. In various examples, the network parameters are usable to transmit data between the one or more UEs and the network with optimal efficiency and accuracy.

The model may also or instead generate network recommendations that optimize network performance (e.g., increases the Quality of Signal versus not implementing the model). In some instances, the recommendations can be communicated to engineering teams in different regions thereby enabling an engineering team in one city, state, or country to implement network improvements based on data associated with another engineering team in a different city, state, or country. Additionally or alternatively, the data output by the model can be stored in a database or server and made available remotely over a computer network for access by humans or other machine learned models responsible for designing and/or managing a telecommunication network (e.g., mitigating interference, maintaining equipment, etc.).

In various examples, the model can act as a recommendation engine that outputs recommendations based at least in part on detecting one or more similarities between cells. By way of example and not limitation, the model may determine a difference between a first signal quality associated with a first cell and a second signal quality of a second cell, and output parameters that optimize the first cell or the second cell having the lower signal quality. Though this example identifies a difference in signal quality, comparing other features of cells is also contemplated including using one or more clustering algorithms as discussed throughout this disclosure.

In some examples, a computing device can implement a clustering component to receive input data representing one or more of: network configuration data, network user data, location data and/or map data. The clustering component can implement one or more clustering techniques (e.g., k-means, k-medians, k-prototype, expectation maximization (EM), hierarchical clustering, etc.) to cluster the input data. In some examples, the clustering component represents a machine learned model that processes the input data independent of flattening and/or weighing the input data (e.g., the model can implement a k-prototype algorithm or similar algorithm that enables clustering of numerical data and categorical data). In some examples, the clustering techniques employed by the model are based at least in part on least dissimilarity between cells.

The clustering component can, in various examples, determine an output indicating a first cluster and a second cluster different from the first cluster. In such examples, the first cluster may be associated with a first distribution of multiple UEs in a first geographical region (e.g., county, city, etc.), and the second cluster may be associated with a second distribution of multiple UEs in a second geographical region (e.g., county, city, etc.). However, in other examples, the first cluster and the second cluster may be associated with a same geographical region.

In various examples, the clustering component can be configured to output a predetermined number of clusters, and determine a distribution of cells and/or multiple user equipment (UEs) in each cluster. The computing device can implement an analysis component to compare data associated with each cluster and/or to identify similarities among the clusters and the cell(s) associated therewith. In such examples, comparing data of the clusters can be based on assigning bins (e.g., geographical areas) to each cluster and comparing attributes of the cells and/or UEs in each bin. To improve accuracy of an output, the model can identify bins without a cell and assign one or more cells to the empty bin thereby enabling the model to compare additional bins of different clusters.

In some examples, data output by the clustering component and/or the analysis component can be used generate recommendations that improve performance of a cell or network. For instance, a network element (e.g., a cell, an antennae, a transceiver, etc.) of a first cluster may be associated with higher network performance and quality than another network element of a second cluster. Accordingly, the computing device can generate network parameters that cause the overall throughput in the second cluster to improve based on network data associated with the first cluster. By way of example and not limitation, the first cluster may be associated with a city different from a city associated with the second cluster. By implementing the clustering techniques described herein, a telecommunication network can be designed (e.g., by an engineering team or machine learned model) with consideration to network equipment selection like radio, antenna etc., location selection and associated aspects like height of antenna, angle of antenna position etc., network parameters, features, strategies etc. from another geographical area that generally would not have been considered due to lack of available data.

The clustering techniques may also or instead be used to determine performance benchmarks for cells or networks across different geographical regions. For example, by identifying how similarly configured networks perform in different areas (e.g., independent of seasonality, land use, etc.), a network in a first location can be used to set more realistic and achievable benchmarks for performance of the network in the first location or a second location. In some examples, performance benchmarks for cells or networks can be made for different times in the future (e.g., over a lifetime of the equipment providing services by the network). Using the clustering techniques as described herein, a computing device can generate, identify, or otherwise determine network modification that improve network quality and performance.

The clustering techniques may include implementing a system to request, receive, and aggregate data (e.g., network data, user data, location data, and the like) associated with specific locations within a network. For example, the system may employ a computing device configured to facilitate an exchange of data between user equipment (UE) and network equipment. In some examples, the data usable to determine network quality can be received by the computing device to ascertain network configurations that minimize interference and/or maximize throughput.

FIG. 1 depicts an example network environment 100 in which example devices can connect to a telecommunication network to implement the clustering techniques described herein. As depicted in FIG. 1, a 5G system 102 comprises a 5G core network 104 and a computing device 106 that is configured to exchange data with devices located in a first geographic area 108 and/or a second geographic area 110 (e.g., an area served by a cell, an area defined by a map, and so on). FIG. 1 further illustrates the first geographic area 108 comprising a first network element 112 associated with one or more of: a vehicle 114, a UE 116, or an Unmanned Aerial Vehicle (UAV) 118, and the second geographic area 110 comprising a second network element 120 associated with one or more of: a vehicle 122, a UE 124, or a UAV 126.

In some examples, the first network element 112 and the second network element 120 can represent an antennae or other component of the 5G network 104 configured to transmit and/or receive wireless communications with one or more devices (e.g., vehicles, UEs, and/or UAVs). The computing device 106 comprises a clustering component 128 and an analysis component 130 to implement the clustering techniques described herein. Though described separately in FIG. 1 for ease of discussion, the clustering component 128 and the analysis component 130 (and the functionality associated therewith) may, in some examples, be included in a single component, such as a machine learned model.

In some examples, the clustering component 128 may implement a machine learned model trained to cluster various types of input data from different sources. For example, the machine learned model may receive user data from the devices (the aforementioned vehicle(s), UE(s), and/or UAV (s)) associated with the first network element 112 and/or the second network element 120, network configuration data from different network elements, location data from a map source, and the like. Training a machine learned model such as the clustering component 128 to improve cluster predictions is described in FIG. 5, and elsewhere.

In various examples, the analysis component 130 represents functionality to process the clusters output by the clustering component 128 and determine parameters that improve overall performance (e.g., reduce interference and maximize throughput) of the 5G core network 104 (e.g., performance of the first network element 112 and/or the second network element 120). By implementing the computing device 106, data can be received and processed thereby enabling network improvements to be designed into new or existing networks.

The vehicle 110 can comprise a vehicle that requires a driver, a semi-autonomous vehicle, or an autonomous vehicle that does not require a driver for navigation, and includes a device to wirelessly connect to the 5G core network 104.

The UE 116 represents any device that can wirelessly connect to the 5G core network 104, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 116 is illustrated in greater detail in FIG. 7.

The UAV 114 represents a device included in an unmanned aerial vehicle that can wirelessly connect to the 5G core network 104. In some examples, one or more UAVs can cause potential interference between an antennae and one or more UEs, UAVS, vehicles, etc. To mitigate the potential interference, the computing device 106 can initiate clustering techniques that compare clusters one to another. Based on clusters output by the clustering component 128, the analysis component 130 can determine network parameters that reduce or eliminate the potential interference (parameters for the first network element 112 and/or the second network element 120). In some examples, the network parameters can represent one or more of: downlink power, uplink power, number of downlink transmitters, number of uplink transmitters, numbers of concurrently connected users, cell radius, and so on.

The analysis component 130 can, in some examples, compare cluster data associated with different clusters to identify the network parameters that, if implemented, causes the 5G network 104 to operate at peak throughput (e.g., upload throughput, download throughput, or a combination thereof) for future communications with UEs and the like. Example network parameters can include, but are not limited to: a location, a signal strength, a beam Precoding Matrix Indicator (PMI) number, a frequency, a power, or a signal-to-noise ratio to transmit data between the one or more UEs and the 5G core network 104. Additional details of the clustering component 128 and the analysis component 130 are described in FIG. 3, and elsewhere.

In various examples, the 5G system 104 can represent functionality to provide communications between the computing device 106, the first network element 112, and the second network element 120, and can include one or more radio access networks (RANs), as well as one or more core networks linked to the RANs. For instance, the UE 116 can wirelessly connect to the first network element (e.g., a base station or other access point of a RAN), and in turn be connected to the 5G core network 104. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the 5G system 102 is compatible to operate with other radio technologies including those of other service providers.

In some examples, the 5G core network 104 can represent a service-based architecture that includes multiple types of network functions that process control plane data and/or user plane data to implement communications for the vehicle 110, the UE 116, and/or the UAV 114. The network functions of the 5G core network 104 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Figure 2:
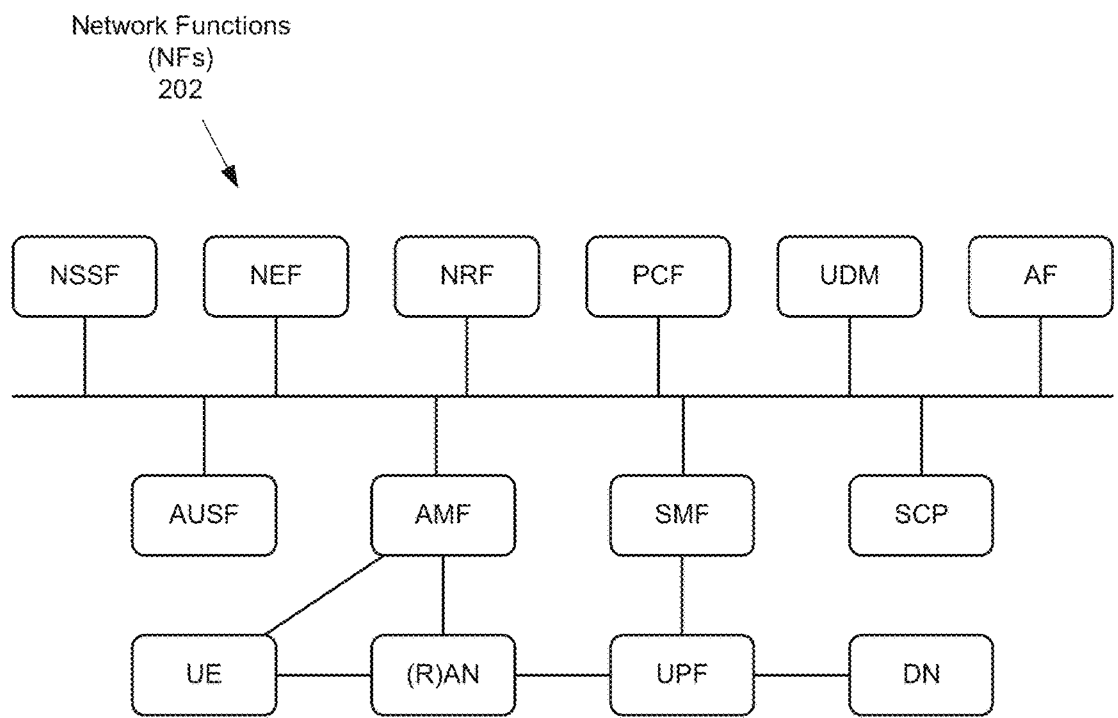
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 104 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 104), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G core network 104 can be implemented as network applications that execute within containers (not shown). 5G NFs 202 can execute as hardware elements, software elements, and/or combinations of the two within telecommunication network(s), and accordingly many types of 5G NFs 202 can be implemented as software and/or as virtualized functions that execute on cloud servers or other computing devices. Network applications that can execute within containers can also include any other type of network function, application, entity, module, element, or node.

Figure 3:
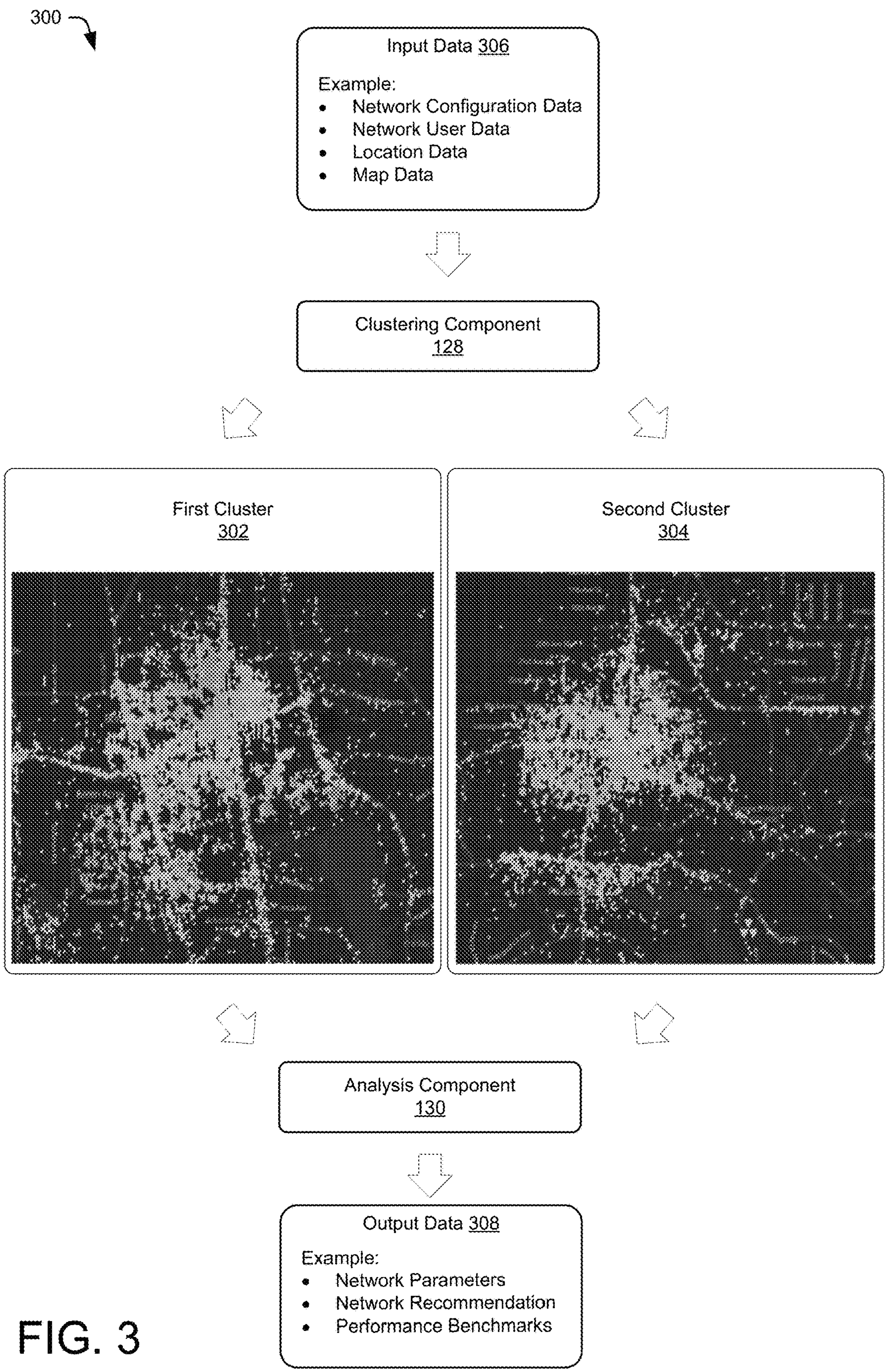
FIG. 3 depicts another example network environment in which an example computing device implements the clustering techniques described herein.

FIG. 3 depicts another example network environment 300 in which an example computing device implements the techniques described herein. For instance, the computing device 106 in FIG. 1 can implement the clustering component 128 to generate a first cluster 302 associated with the first geographic area 108 and a second cluster 304 associated with the second geographic area 110.

FIG. 3 illustrates various datapoints representing devices (e.g., UEs, vehicles, UAVs, and the like) in the first cluster 302 and the second cluster 304. In various examples, the first cluster 302 or the second cluster 304 can indicate distances and/or angles of the devices relative to a network element. In examples when a cluster comprises more than one network element, the clustering component 128 can determine a distance, an angle, and/or an elevation between each UE and the respective network element (e.g., an antennae) relative to a coordinate system to normalize the distances and angles for processing by the analysis component 130.

In some examples, the clustering component 128 can determine a first direction of signals output by the first antennae relative to the environment, determine a second direction of signals output by a second antennae relative to the environment, and associate the first direction of signals output by the first antennae and the second direction of signals output by a second antennae with a coordinate system. Accordingly, information describing a spatial relationship between the devices and the network element may be determined relative to the coordinate system.

In various examples, the clustering component 128 can receive input data 306 indicative of network configuration data, network user data, location data, and/or map data. For example, the network configuration data may comprise one or more of: bandwidth, security, antennae height, or antennae type, just to name a few. The network user data may indicate an access type for one or more UEs such as whether a UE is using a file transfer protocol (FTP) , a voice call protocol, or other data protocol for file transfer, streaming, browsing, voice over data, emailing, gaming and the like. For instance, the network user data may indicate one or more of: a transmission control protocol (TCP), an internet protocol (IP), a user datagram protocol (UDP), a simple mail transport protocol (SMTP), a file transfer protocol (FTP), a hyper text transfer protocol (HTTP), a hyper text transfer protocol secure (HTTPS), and the like. The network user data may also or instead indicate an access rate, an average download speed, and/or an average upload speed associated with one or more UEs. The location data may be associated with a UE, a network element, or a combination thereof. For example, the location data can comprise positions of the multiple UEs relative to the network element, a position of the network element in the environment, and the like.

Generally, the input data 306 can represent one or more of: frequency channel, frequency band, frequency bandwidth, wireless technology, node, cell, sector, sector bandwidth capacity, antennae height relative to ground, antennae height relative to sea level, angle of antennae relative to the ground, angle of antennae relative to true North, land information, antennae type, deployment infrastructure, signal strength to user equipment, Quality of Signal to user equipment, transmit power, transmit frequency, antennae size, antennae weight, master controller type, number of data streams assigned to user equipment, number of network elements within a threshold distance, number of additional network elements within a threshold distance of the network element, distance to the additional network element, angle to the additional network element, elevation between user equipment and the network element, elevation between the network element and the additional network element, amount of data transferred between the network element and one or more user equipment, time to generate the network configuration data, user coverage classification, user equipment type, user equipment operating system, user application type, user equipment usage data, an amount of predicted data usage at a future time, backhaul capacity, manufacturer of the network element, or manufacturer of cables associated with the network element. In various examples, the input data 306 can be associated with or otherwise received from multiple data sources and/or data types.

As shown in FIG. 3, the first cluster 302 and the second cluster 304 are associated with map data indicating a street, highway, and other map features. In some examples, the clustering component 128 can determine a cluster type for the first cluster 302 and the second cluster 304 based at least in part on the map data. Example cluster types can be based at least in part on geographical information system (GIS) data and indicate at least one of: dense urban, urban, suburban, rural, barren, highway, forest, roadway, park, educational campus, airport, or commercial area, though other types are contemplated. The analysis component 130 can perform functionality based at least in part on determining that the first cluster type and the second cluster type are a same cluster type. For instance, based at least in part on the first cluster type and the second cluster type being the same cluster type, the analysis component 130 can compare, as a comparison, signal levels, signal quality, (or other network metrics like downlink throughput, uplink throughput, latency, volume of data, amount of call attempts, success, failures, amount of handovers, mean-opinion-score (MOS), signal to interference plus noise ratio (SINR), modulation and coding scheme (MCS), signal strength, UE transmit power, and so on) of multiple UEs in the first cluster 302 with signal levels (or corresponding network metrics) of multiple UEs in the second cluster 304. In such examples, the analysis component 130 can determine, based at least in part on the comparison, output data 308 indicative of the network parameters associated with peak throughput for the multiple UEs of the first cluster 302 or the second cluster 304.

Generally, the clustering component 128 can apply one or more clustering algorithms to the input data 306. For instance, the clustering component 128 can cluster the input data 306 based at least in part on a statistical model (e.g., hierarchical clustering), a machine learned model (algorithms such as k-means, k-medians, k-prototype, etc.), or a combination thereof Generally, the analysis component 130 can implement functionality to identify, determine, and compare data associated with the first cluster 302 and the second cluster 304. For instance, the analysis component 130 can determine a first distribution of the multiple UEs in the first cluster 302 and a second distribution of different multiple UEs in the second cluster, and determine, based at least in part on the first distribution and the second distribution, network parameters associated with peak throughput for the multiple UEs in the first cluster 302 and/or the multiple UEs in the second cluster 304. In some examples, the first distribution indicates a first numerical value (e.g., a percentage, a classification, etc.) of the multiple UEs in the first cluster 302 and the second distribution indicates a second numerical value (e.g., a percentage, a classification, etc.) of the multiple UEs in the second cluster 304. That is, the first cluster 302 can be associated with a first numerical value indicative of a percentage distribution of the multiple UEs in a first cluster and a second numerical value indicative of a classification distribution of the multiple UEs in the second cluster 304.

In various examples, the analysis component 130 can assign a first set of bins to represent geographical areas of the first cluster and assign a second set of bins to represent geographical areas of the second cluster. In such examples, the analysis component 130 can compare, as a comparison, a number of UEs in the first set of bins with a number of UEs in the second set of bins, and determining the network parameters associated with network design (e.g., network element height, network element type, network element angle, etc.) and/or network performance (e.g., peek throughput, signal quality, drop rate, and so on) based at least in part on the comparison. Further discussion of determining bins can be found in FIG. 4, and elsewhere.

In some examples, the computing device 106 (e.g., the clustering component 128 and/or the analysis component 130) can implement a first clustering algorithm to generate an initial cluster(s) based on the input data 306. The first clustering algorithm can represent a hybrid unsupervised machine learning algorithm, such as K-prototype, to cluster numerical data and categorical data associated with the input data 306. The computing device 106 (e.g., the clustering component 128 and/or the analysis component 130) can implement a second clustering algorithm to determine the first cluster 302 and the second cluster 304 based at least in part on the initial cluster(s). In various examples, the first clustering algorithm or the second clustering algorithm can comprise one or more of: a k-means, a k-medians, or a k-prototype algorithm.

In various examples, the computing device 106 can store the output data 308 (along with associated metadata describing the cluster) in a database or other memory which enables cluster data determined over time to be searched and/or accessed based on user-specified network characteristics, network parameters, and the like (e.g., such as via a user interface on a display device).

In some examples, the network parameters determined by the computing device 106 to provide peak throughput can include one or more of: a bandwidth, a Time Division Duplex (TDD) ratio configuration, a frequency, a transmission power, or a beamforming Precoding Matrix Indicator (PMI), a location, a signal strength, or a signal-to-noise ratio, just to name a few. In various examples, the network parameters can be applied to network elements to operate the network with optimal efficiency and accuracy.

Figure 4:
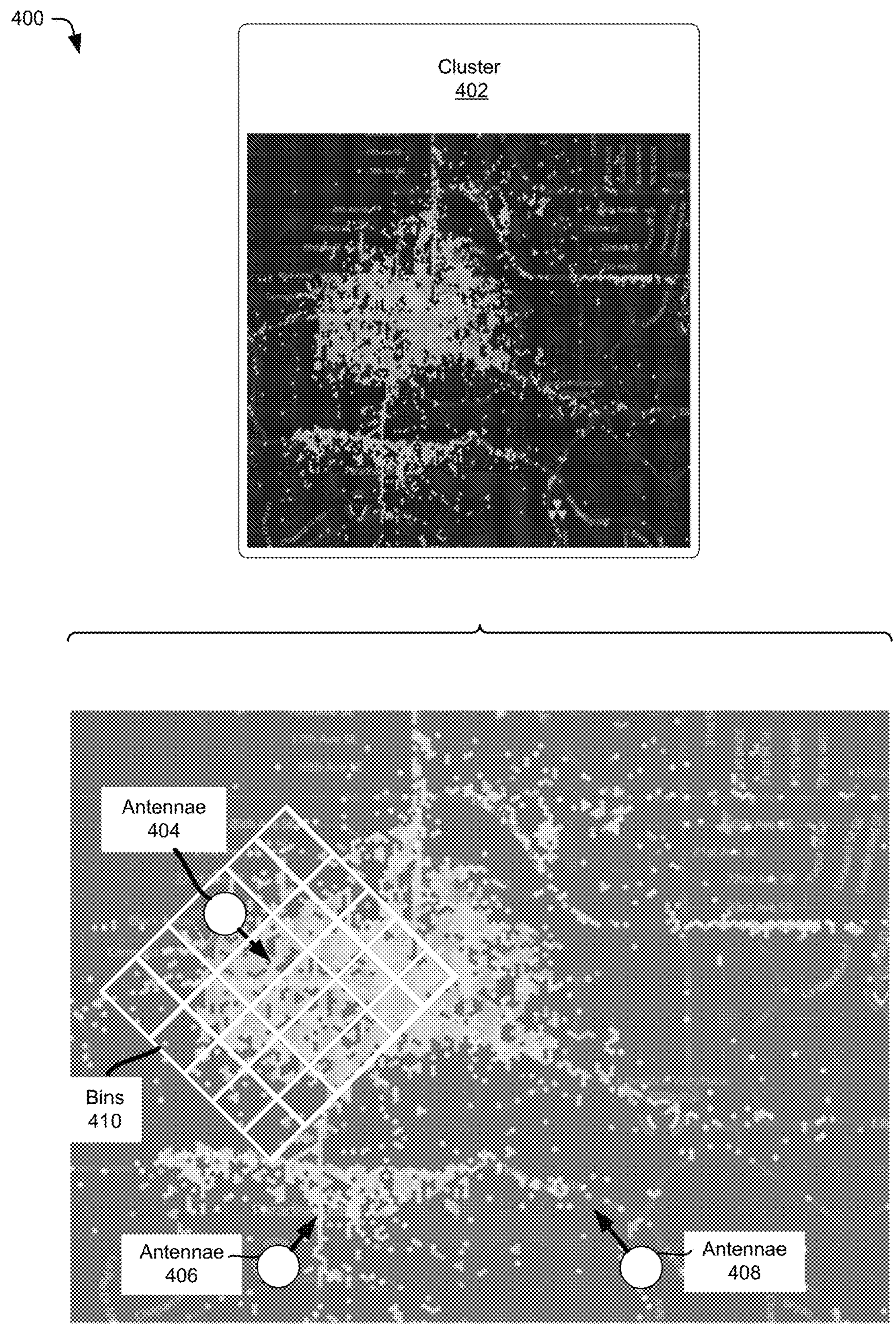
FIG. 4 depicts another example network environment in which an example computing device implements the clustering techniques described herein.

FIG. 4 depicts another example network environment 400 in which an example computing device implements the clustering techniques described herein. In some examples, the computing device 106 in FIG. 1 can perform clustering techniques usable in the 5G system 102 such as showing detail of a cluster 402 determined by the clustering component 128.

As shown in FIG. 4, the cluster 402 comprises antennae 404, antennae 406, and antennae 408, each of which includes an arrow to indicate a direction of signals output by the respective antennae. In some examples, the direction of signals output by the respective antennae can be normalized to a common coordinate system to enable location data, position data, and so on, associated with each antennae to be processed. FIG. 4 further illustrates the antennae 404 comprising a set of bins 410 (e.g., geographical areas corresponding to a vicinity of the antennae 404). Though not shown, the antennae 406 and the antennae 408 may also be associated with a respective set of bins.

Each bin in the set of bins 410 comprises a number of UEs. The analysis component 130 can compare, as a comparison, attributes of the cells and/or UEs in the first set of bins with attributes of the cells and/or UEs in the second set of bins, and determining the network parameters associated with network design (e.g., network element height, network element type, network element angle, etc.) and/or network performance (e.g., peek throughput, signal quality, drop rate, and so on) based at least in part on the comparison.

In some examples, the clustering component 128 can determine a size of the set of bins and/or a number of bins in the set of bins based at least in part on cluster type of the cluster 402. A cluster type may be based on a type of map data and include an urban area, rural area, or other land based data. In an urban cluster type, for instance, more bins and/or bins of a smaller size may be used compared with a number of size of bins in a rural cluster type.

In various examples, determining a number of bins or a size of the bins in the set of bins 410 can be based at least in part on a strength of signal associated with the cluster 402. In such examples, an output by the clustering component 128 and/or the analysis component 130 can be based at least in part on the number of bins or the size of the bins in the set of bins 410.

Figure 5:
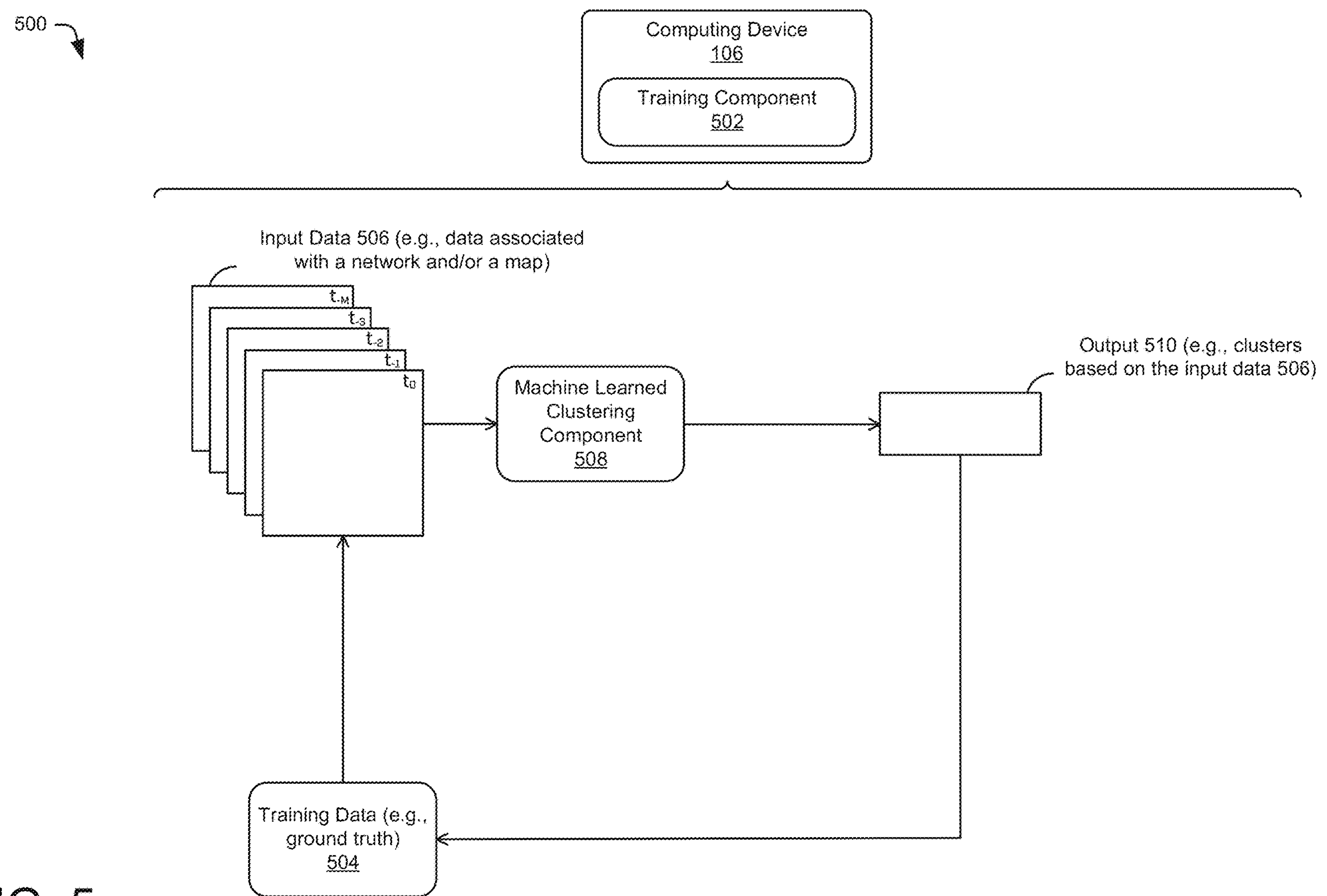
FIG. 5 depicts a block diagram of an example training component for training a machine learned model to implement the techniques described herein.

FIG. 5 depicts a block diagram of an example training component for training a machine learned model to implement the techniques described herein. A computing device (e.g., the computing device 106) can implement a training component 502 to train a machine learning model to output cluster data (e.g., the output data 308).

The training component 502 of a computing device may be executed by a processor to train a machine learned model (e.g., the clustering component 128 and/or the analysis component 130) based on training data 504. The training data 504 may include a wide variety of data, such as image data, video data, map data, location data, network data, sensor data, etc., that is associated with a value (e.g., a desired classification, inference, prediction, etc.). Such values may generally be referred to as a "ground truth." To illustrate, the training data 504 may be used for clustering data and, as such, may include an image of a telecommunication network that is associated with one or more classifications or determinations. In some examples, such a classification may be based on user input (e.g., user input indicating that the image depicts a specific type of cluster) or may be based on the output of another machine learned model. In some examples, such labeled classifications (or more generally, the labeled output associated with training data) may be referred to as ground truth.

In some examples, the computing device implementing the training component 502 may receive (e.g., retrieve) data from a data store, such as a database. In some examples, the computing device may receive data from one or more vehicles, UEs, UAVs, or other equipment accessing the network. The training data 504 may also or instead represent a ground truth of all clusters associated with a network in an environment. For example, a ground truth may comprise data describing an expected association between the various types of input data 506. Ground truth data may be compared against an output (e.g., cluster values associated with a cluster) of a model for use in training.

The input data 506 can be input to a machine learned clustering component 508 (e.g., the clustering component 128). In various examples, the input data 506 can comprise network data associated with different regions in which each region is associated with a cluster value. In some examples, the input data 506 can comprise location(s) of UEs, network elements, and so on relative to a map, as discussed herein. FIG. 5 illustrates input data at times t1, t2, t3, t4, . . . tn (where n is an integer greater than 1).

In some examples, the machine learned clustering component 508 provides an output 510 indicative of one or more clusters (e.g., clusters based on the input data 506) associated with one or more regions of the network. For example, the machine learned clustering component 508 may determine one or more cluster value(s) for a region(s) distinct from each other, for instance.

In some examples, the output 510 from the machine learned clustering component 508 can be compared against the training data 504 (e.g., ground truth representing clustered data) for use in training. For instance, based at least in part on the comparison, parameter(s) associated with the machine learned clustering component 508 can be augmented, altered, and/or updated. In some examples, operations performed by the machine learned clustering component 508 may be performed on another system, such as a centralized computing device accessing one or more processor(s), and results of the training may be transferred to one or more computing devices that operate in the network.

Figure 6:
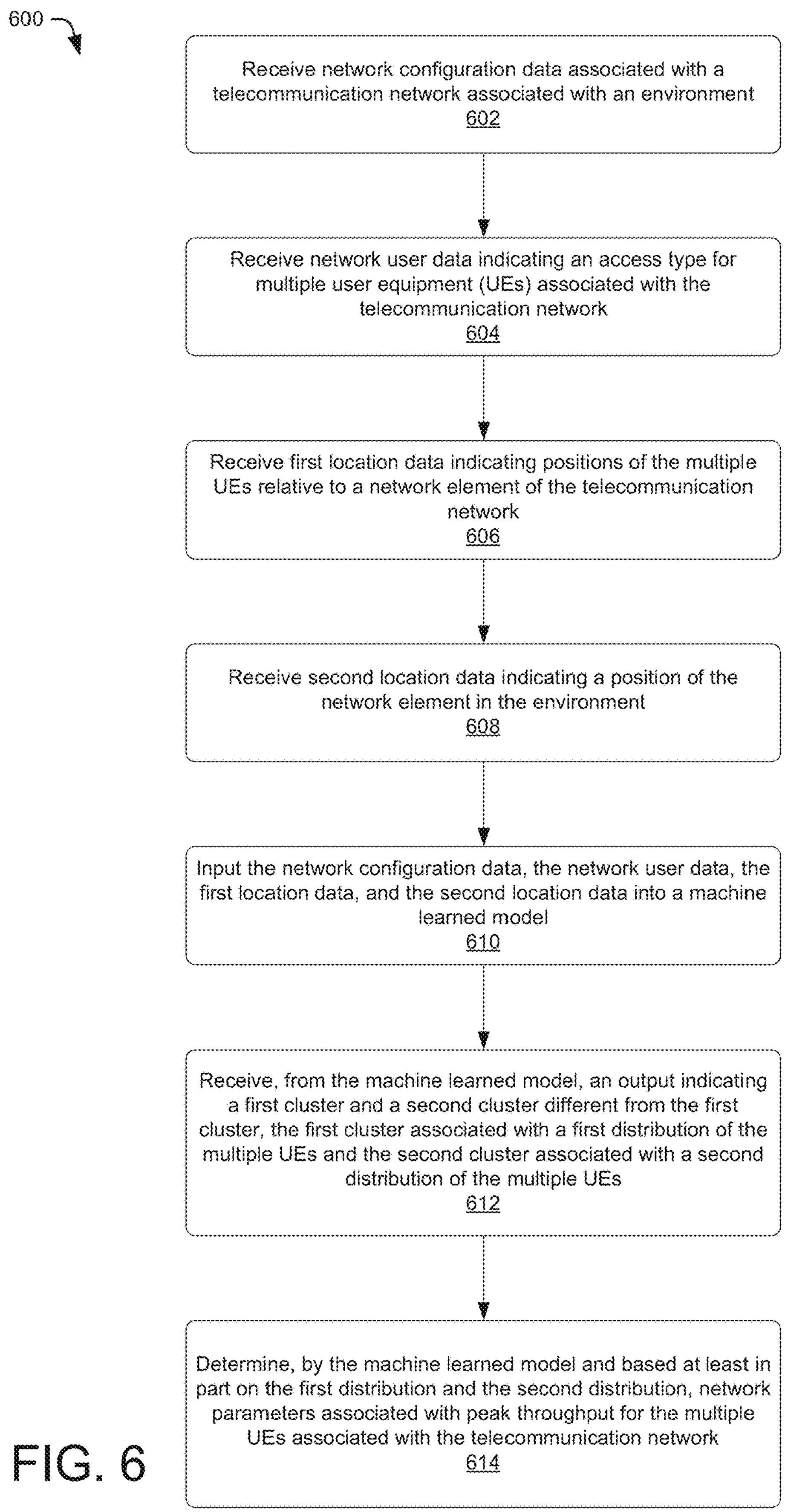
FIG. 6 depicts a flowchart of an example process for clustering input data using an example computing device.

FIG. 6 is a flowchart of an example process 600 for clustering input data using an example computing device. Some or all of the process 600 may be performed by one or more components, tool, or modules in FIGS. 1-5, as described herein. For example, some or all of process 600 may be performed by the computing device 106.

At operation 602, the process may include receiving network configuration data associated with a telecommunication network associated with an environment. By way of example and not limitation, a computing device of a fifth generation system that includes a fifth generation core network can receive data describing a configuration of the network. In some examples, the operation 602 may include the computing device 106 receiving bandwidth, security, antennae height, or antennae type information associated with one or more antennas in the network. In some examples, the operation 602 may include the computing device 106 receiving one or more of the input data 306. By way of example and not limitation, the network configuration data can comprise one or more of: a signal frequency identifier used by a network element to communicate with a UE (e.g., 700 Mhz, 850 Mhz, etc.), a set of frequency channels representing a contiguous resource (e.g., PCS band, AWS band, etc.), a wireless technology (e.g., 5G, LTE, CDMA, GSM, etc.), a node (e.g., a group of a cell or sector which share common resources such as a tower, a baseband, a backhaul, etc.), cell, sector, sector bandwidth capacity, network element height, etc. In various examples, the network configuration data may identify a deployment infrastructure (e.g., equipment installation type tower, street pole, building rooftop, in a building, etc.), an angle of the network element relative to true North, and/or land use information. For instance, the deployment infrastructure may identify an angle of the equipment and/or network element relative to a geographic coordinate system (e.g., an angle relative to true North), a height of the equipment and/or the network element relative to the ground, and so on.

At operation 604, the process may include receiving network user data indicating an access type for multiple user equipment (UEs) associated with the telecommunication network. In some examples, the operation 604 may include receiving user data indicating one or more of: signal strength measured at the UE, signal to noise ratio measured at the UE, UE type, UE operating system, a type of application used in a network communication session, times and/or amounts of data communication, or data seasonality (e.g., events or times associated with higher data activity such as around a stadium with many UEs).

At operation 606, the process may include receiving first location data indicating positions of the multiple UEs relative to a network element of the telecommunication network. In some examples, the operation 606 may include receiving a distance and/or an angle between the multiple UEs and a network element. In some examples, the first location data may include a height of the UEs relative to sea level, and/or relative to the network element.

At operation 608, the process may include receiving second location data indicating a position of the network element in the environment. In some examples, the second location data may include receiving an angle of a signal output by a network element, an angle of signals relative to the ground, and so on. In some examples, the second location data may include a height of the network element relative to sea level, relative to another network element, and/or relative to one or more UEs.

At operation 610, the process may include inputting the network configuration data, the network user data, the first location data, and the second location data into a machine learned model. In some examples, the operation 610 may include the computing device 106 receiving the network configuration data, the network user data, the first location data, and the second location data (also referred to collectively as "input data"). In various example, the input data may be input into the clustering component 128 and/or the analysis component 130.

At operation 612, the process may include receiving, from the machine learned model, an output indicating a first cluster and a second cluster different from the first cluster, in which the first cluster is associated with a first distribution of the multiple UEs and the second cluster associated with a second distribution of the multiple UEs. In some examples, the operation 612 may include the computing device 106 receiving the output data 308 from the analysis component 130.

At operation 614, the process may include determining, by the machine learned model and based at least in part on the first distribution and the second distribution, network parameters associated with peak throughput for the multiple UEs associated with the telecommunication network. In various examples, the network parameters can include one or more of: a location, a signal strength, a beam Precoding Matrix Indicator (PMI) number, a frequency, a power, or a signal-to-noise ratio associated with a UE or a base station associated with the network. In various examples, the network parameters determined by the computing device 106 can be used to improve service to the one or more UEs accessing the network (relative to not implementing the clustering techniques by computing device 106, for example). In some examples, the operation 614 may include the computing device 106 storing the output data in storage (e.g., a database, a memory, and so on). In other examples, the machine learned model can determine the network parameters associated with network design (e.g., network element height, network element type, network element angle, etc.) and/or network performance (e.g., peek throughput, signal quality, drop rate, and so on) the first distribution and the second distribution.

Figure 7:
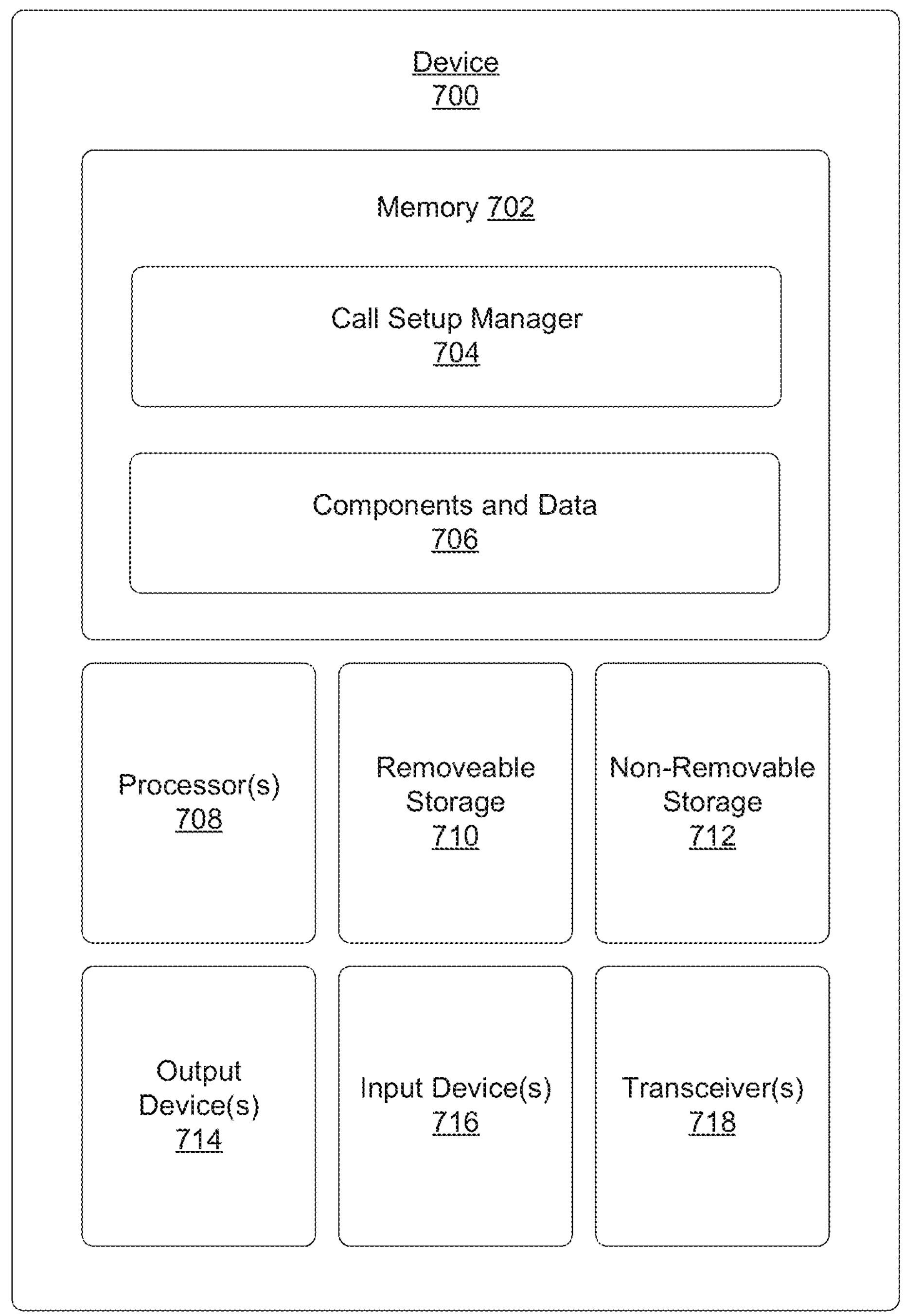
FIG. 7 depicts an example system architecture for a user equipment.

FIG. 7 depicts an example system architecture for a device 700, in accordance with various examples. As shown, the device 700 can include memory 702 storing a call setup manager 704, and other components and data 706. The device 700 is also shown to comprise processor(s) 708, removeable storage 710, non-removable storage 712, output device(s) 714, input device(s) 716, and/or transceiver(s) 718. In some examples, the device 700 can be implemented as the computing device 106, the vehicle 114, the UE 116, and/or the UAV 118, just to name a few.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 116. Any such non-transitory computer-readable media may be part of the UE 116.

In some examples, the call setup manager 704 can send and/or receive messages including SIP messages associated with the network functions shown in FIG. 2. For instance, the call setup manager 704 can facilitate the exchange of messages between the device 700 and other components and/or devices associated with the 5G core network 104.

The other components and data 706 can be utilized by the device 700 to perform or enable performing any action taken by the device 700. The components and data 706 can include a UE platform, operating system, and applications, and data utilized by the platform, operating system, and applications. In some examples, the components and data 706 can include the clustering component 128, the analysis component 130, and/or the training component 502.

In various examples, the processor(s) 708 can be a central processing unit (CPU), a graphics processing unit (GPU), or both CPU and GPU, or any other type of processing unit or component known in the art. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 is configured to retrieve and execute instructions from the memory 702.

The device 700 also includes additional data storage devices (removable and/or non-removable) such as, for example, magnetic disks, optical disks, or tape. Such additional storage is illustrated in FIG. 7 by removable storage 710 and non-removable storage 712. Tangible computer-readable media can include volatile and non-volatile, removable and non-removable media implemented in any method or technology for storage of information, such as computer readable instructions, data structures, program modules, or other data. The memory 702, the removable storage 710 and the non-removable storage 712 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 700. Any such tangible computer-readable media can be part of the device 700.

The memory 702, the removable storage 710, and/or the non-removable storage 712 may in some cases include storage media used to transfer or distribute instructions, applications, and/or data. In some cases, the 702, the removable storage 710, and/or the non-removable storage 712 may include data storage that is accessed remotely, such as network-attached storage that the device 700 accesses over some type of data communications network.

In various examples, any or all of the memory 702, the removable storage 710, and/or the non-removable storage 712 may store programming instructions that, when executed, implement some or all of the function functionality described herein.

In various example, the output device(s) 714 can include any sort of output devices known in the art, such as a display, speakers, a vibrating mechanism, printers, and/or a tactile feedback mechanism. Output device(s) 714 can also include ports for one or more peripheral devices, such as headphones, peripheral speakers, and/or a peripheral display. The input device(s) 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

As illustrated in FIG. 7, the device 700 also includes one or more wired or wireless transceiver(s) 718. For example, the transceiver(s) 718 can include an antennae, a network interface card (NIC), a network adapter, a LAN adapter, or a physical, virtual, or logical address to connect to various networks, devices, or components illustrated in figures herein. To increase throughput when exchanging wireless data, the transceiver(s) 718 can utilize multiple-input/multiple-output (MIMO) technology. The transceiver(s) 718 can comprise any sort of wireless transceivers capable of engaging in wireless, radio frequency (RF) communication. The transceiver(s) 718 can also include other wireless modems, such as a modem for engaging in Wi-Fi, WiMAX, BLUETOOTH®, infrared communication, and the like. In some examples, the transceiver(s) 718 can be compatible with multiple radio access technologies, such as 5G radio access technologies and 4G/LTE radio access technologies. Accordingly, the transceiver(s) 718 can, in some examples, allow the computing device 106 to connect to the 5G system 102 described herein.

The various techniques described herein may be implemented in hardware, software, or a combination thereof. For instance, FIG. 6 illustrates example processes illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

receiving network configuration data associated with a telecommunication network associated with an environment, the network configuration data identifying a deployment infrastructure including an angle of a network element of the telecommunication network relative to a geographic coordinate system;

receiving network user data indicating an access type for multiple user equipment (UEs) associated with the telecommunication network;

receiving first location data indicating positions of the multiple UEs relative to the network element;

receiving second location data indicating a position of the network element in the environment;

inputting the network configuration data, the network user data, the first location data, and the second location data into a machine learned model;

receiving, from the machine learned model, an output indicating, in a common coordinate system, a first cluster and a second cluster different from the first cluster, the first cluster associated with a first distribution of the multiple UEs and the second cluster associated with a second distribution of the multiple UEs, the common coordinate system generated by normalizing the geographic coordinate system; and determining, by the machine learned model and based at least in part on the first distribution and the second distribution, network parameters associated with peak throughput for the multiple UEs associated with the telecommunication network.

2. The method of claim 1, wherein:

the network configuration data comprises one or more of: bandwidth, security, antenna height, or antenna type;

the access type for the multiple UEs comprises one or more of: a transmission control protocol (TCP), an internet protocol (IP), a user datagram protocol (UDP), a simple mail transport protocol (SMTP), a file transfer protocol (FTP), a hyper text transfer protocol (HTTP), or a hyper text transfer protocol secure (HTTPS);

the first location data indicating the positions of the multiple UEs relative to the network element comprise a distance between a UE of the multiple UEs and the network element, and an angle of each respective UE relative to the network element;

the second location data indicates a position of the network element relative to a map coordinate system representing the environment; and the first distribution indicates a first percentage of the multiple UEs in the first cluster and the second distribution indicates a second percentage of the multiple UEs in the second cluster.

3. The method of claim 1, further comprising:

assigning a first set of bins to represent geographical areas of the first cluster;

assigning a second set of bins to represent geographical areas of the second cluster;

comparing, as a comparison, a number of UEs in the first set of bins with a number of UEs in the second set of bins; and determining, by the machine learned model and based at least in part on the comparison, the network parameters associated with peak throughput for the multiple UEs associated with the telecommunication network.

4. The method of claim 1, wherein:

the network element is an antenna; and the first cluster or the second cluster indicates a distance between a UE of the multiple UEs and the antenna and an angle of the UE relative to the antenna.

5. The method of claim 4, wherein the antenna is a first antenna, and the method further comprising:

determining a first direction of signals output by the first antenna relative to the environment;

determining a second direction of signals output by a second antenna of the telecommunication network relative to the environment;

associating the first direction of signals output by the first antenna and the second direction of signals output by the second antenna with the common coordinate system; and determining the angle of the UE relative to the common coordinate system.

6. The method of claim 1, wherein:

the network configuration data is associated with a first data source;

the network user data is associated with a second data source;

the first location data is associated with a third data source;

the second location data is associated with a fourth data source; and the first data source, the second data source, the third data source, and the fourth data source are different data sources.

7. The method of claim 1, further comprising:

determining, based at least in part on map data, a first cluster type for the first cluster and a second cluster type for the second cluster;

determining that the first cluster type and the second cluster type are a same cluster type;

based at least in part on the first cluster type and the second cluster type being the same cluster type, comparing, as a comparison, signal levels of the multiple UEs in the first cluster with signal levels of the multiple UEs in the second cluster; and determining the network parameters associated with peak throughput for the multiple UEs is further based at least in part on the comparison.

8. A system comprising:

one or more processors; and memory storing computer-executable instructions that, when executed by the one or more processors, cause the system to perform operations comprising:

receiving, by a machine learned model, input data comprising two or more of:

network data representing attributes of a first network element associated with a telecommunication network, the network data including network configuration data identifying a deployment infrastructure including an angle of the first network element relative to a geographic coordinate system;

position data representing positions of multiple user equipment (UEs) relative to the first network element and a position of the first network element relative to a coordinate system;

user data representing an access type or an access rate of a UE associated with the telecommunication network; or map data representing features of an environment of the telecommunication network;

determining, by the machine learned model, a first numerical value indicative of a percentage distribution of the multiple UEs in a first cluster in a common coordinate system and a second numerical value indicative of a percentage distribution of the multiple UEs in a second cluster in the common coordinate system, the second cluster different from the first cluster, the common coordinate system generated by normalizing the geographic coordinate system; and determining, by the machine learned model and based at least in part on the first numerical value and the second numerical value, network parameters associated with peak throughput for the multiple UEs associated with the telecommunication network.

9. The system of claim 8, the operations further comprising:

determining, by the machine learned model, a first set of bins to represent first geographical areas of the first cluster;

determining, by the machine learned model, a second set of bins to represent second geographical areas of the second cluster; and determining, by the machine learned model and based at least in part on the first set of bins or the second set of bins, the network parameters associated with peak throughput for the multiple UEs associated with the telecommunication network.

10. The system of claim 9, the operations further comprising:

comparing, as a comparison, a number of UEs in the first set of bins with a number of UEs in the second set of bins; and determining, by the machine learned model and based at least in part on the comparison, the network parameters associated with peak throughput for the multiple UEs associated with the telecommunication network.

11. The system of claim 9, the operations further comprising:

determining, based at least in part on map data, a first cluster type for the first cluster and a second cluster type for the second cluster; and determining a size of the first set of bins or the second set of bins based at least in part on the first cluster type or the second cluster type.

12. The system of claim 11, wherein the first cluster type or the second cluster type is based at least in part on geographical information system (GIS) data and indicates at least one of: dense urban, urban, suburban, rural, barren, highway, forest, roadway, park, educational campus, airport, or commercial area.

13. The system of claim 9, the operations further comprising:

determining a number of bins in the first set of bins or the second set of bins based at least in part on a first strength of signal associated with the first cluster and a second strength of signal associated with the second cluster; and determining the first numerical value and the second numerical value is further based at least in part on the number of bins in the first set of bins or the second set of bins.

14. The system of claim 8, wherein:

the position data further comprises an elevation of the UE relative to the first network element;

the network data further indicates an average download speed or an average upload speed for a UE of the multiple UEs associated with the telecommunication network; and the map data indicates a city or region associated with the first network element.

15. The system of claim 8, the operations further comprising:

normalizing the input data into initial clusters based at least in part on a first clustering algorithm; and determining, based at least in part on a second clustering algorithm processing the initial clusters, the first cluster and the second cluster.

16. A method comprising:

receiving first data associated with a first network element of a telecommunication network, the first data including first network configuration data identifying a deployment infrastructure associated with the first network element including an angle of the first network element relative to a geographic coordinate system, the first network element associated with first multiple user equipment (UEs);

receiving second data associated with a second network element of the telecommunication network, the second data including second network configuration data identifying a deployment infrastructure associated with the second network element including an angle of the second network element relative to the geographic coordinate system, the second network element different from the first network element and associated with a second multiple user equipment (UEs);

inputting the first data and the second data into a machine learned model;

receiving, from the machine learned model and based at least in part on the first data and the second data, an output indicating, in a common coordinate system, a first cluster and a second cluster different from the first cluster, the first cluster associated with a first distribution of the first multiple UEs and the second cluster associated with a second distribution of the second multiple UEs, the common coordinate system generated by normalizing the geographic coordinate system;

determining, by the machine learned model and based at least in part on the first distribution and the second distribution, a similarity between the first network element and the second network element; and determining, by the machine learned model and based at least in part on the similarity, a parameter for the first network element or the second network element to cause peak throughput for the first multiple UEs or the second multiple UEs.

17. The method of claim 16, wherein the first cluster is associated with a first city and the second cluster is associated with a second city different from the first city.

18. The method of claim 16, wherein:

the first data indicates user access data, positions of the first multiple UEs relative to the first network element, and an angle of a UE of the first multiple UEs relative to the first network element; and the second data indicates user access data, positions of the first multiple UEs relative to the second network element, and an angle of a UE of the second multiple UEs relative to the second network element.

19. The method of claim 16, wherein the parameter comprises one or more of: a frequency channel, a frequency band, a frequency bandwidth, or a wireless protocol.

20. The method of claim 16, wherein the first network element is a first antenna and the second network element is a second antenna different from the first antenna.

* * * * *